US012307996B2

(12) United States Patent
Xiong et al.

(10) Patent No.: US 12,307,996 B2
(45) Date of Patent: May 20, 2025

(54) GATE ON ARRAY (GOA) CIRCUIT FOR DISPLAY PANEL SOLVING PROBLEM OF INCONSISTENT IMPEDANCES AND CAPACITIVE REACTANCE OF CLOCK SIGNAL CARRIERS

(71) Applicant: Shenzhen China Star Optoelectronics Semiconductor Display Technology Co., Ltd., Guangdong (CN)

(72) Inventors: Jue Xiong, Guangdong (CN); Bangyin Peng, Guangdong (CN); Ilgon Kim, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 856 days.

(21) Appl. No.: 16/968,372

(22) PCT Filed: Jul. 3, 2020

(86) PCT No.: PCT/CN2020/100085
§ 371 (c)(1),
(2) Date: Aug. 7, 2020

(87) PCT Pub. No.: WO2021/243789
PCT Pub. Date: Dec. 9, 2021

(65) Prior Publication Data

US 2023/0178047 A1 Jun. 8, 2023

(30) Foreign Application Priority Data

Jun. 1, 2020 (CN) ......................... 202010485830.3

(51) Int. Cl.
*G09G 3/36* (2006.01)

(52) U.S. Cl.
CPC ... *G09G 3/3677* (2013.01); *G09G 2300/0408* (2013.01)

(58) Field of Classification Search
CPC ...... G09G 3/36; G09G 3/3611; G09G 3/3614; G09G 3/3622; G09G 3/3625;
(Continued)

(56) References Cited

U.S. PATENT DOCUMENTS 6,373,458 B1 4/2002 Yamakura et al.
8,004,480 B2 * 8/2011 Kim ..................... G09G 3/3291 345/82
(Continued)

FOREIGN PATENT DOCUMENTS

CN 1256480 A 6/2000
CN 102270433 A 12/2011
(Continued)

*Primary Examiner* — Ke Xiao
*Assistant Examiner* — Nelson Lam
(74) *Attorney, Agent, or Firm* — PV IP PC; Wei Te Chung

(57) ABSTRACT

A display panel of the present application is disclosed. The display panel includes a GOA circuit, a plurality of clock main lines on a side of the GOA circuit, and a plurality of clock branch lines connected to each of the corresponding clock main lines, respectively. By providing the different first protrusion components and second protrusion components in the corresponding clock branch lines, the equivalent impedance of these clock branch lines can be adjusted to be equal. By providing the bridge components with different areas in the corresponding clock branch lines, the equivalent capacitive reactance of these clock branch lines can be adjusted to be equal.

18 Claims, 3 Drawing Sheets

(58) Field of Classification Search
CPC .. G09G 3/3644; G09G 3/3648; G09G 3/3666; G09G 3/3674; G09G 3/3677; G09G 3/3681; G09G 3/3685; G09G 3/3688; G09G 3/3692; G09G 3/3696
USPC .................................................... 345/87–104
See application file for complete search history.

(56) References Cited

U.S. PATENT DOCUMENTS

| | | | | |
|---|---|---|---|---|
| 8,711,318 | B2 * | 4/2014 | Ahn | G02F 1/13454 349/149 |
| 10,997,939 | B2 * | 5/2021 | Shin | G02F 1/136286 |
| 11,158,275 | B2 * | 10/2021 | Shin | G11C 19/28 |
| 11,257,455 | B2 * | 2/2022 | Xiong | G09G 3/3677 |
| 2003/0086048 | A1 * | 5/2003 | Ukita | G02F 1/1345 349/149 |
| 2006/0123293 | A1 * | 6/2006 | Kim | G09G 3/3291 714/724 |
| 2010/0033666 | A1 * | 2/2010 | Akiyama | G02F 1/136259 349/143 |
| 2012/0168762 | A1 * | 7/2012 | Kikuchi | G02F 1/13458 257/E29.273 |
| 2013/0162616 | A1 | 6/2013 | Park | |
| 2013/0278567 | A1 * | 10/2013 | Chang | G06F 1/10 345/204 |
| 2015/0221272 | A1 * | 8/2015 | Xu | G09G 3/3648 345/92 |
| 2016/0125823 | A1 * | 5/2016 | Huang | G09G 3/36 345/96 |
| 2017/0200420 | A1 * | 7/2017 | No | G06F 13/1689 |
| 2018/0166018 | A1 * | 6/2018 | Yang | G09G 3/3266 |
| 2019/0333433 | A1 * | 10/2019 | Zhu | G09G 3/20 |
| 2021/0027704 | A1 * | 1/2021 | Tong | G09G 3/3233 |
| 2022/0114941 | A1 * | 4/2022 | Gan | G09G 3/3677 |
| 2022/0114980 | A1 * | 4/2022 | Gao | G09G 3/3674 |
| 2022/0122503 | A1 * | 4/2022 | Xiao | G09G 3/2003 |
| 2023/0092089 | A1 * | 3/2023 | Zhang | G02F 1/133388 257/91 |
| 2024/0012299 | A1 * | 1/2024 | Xiao | G02F 1/136222 |

FOREIGN PATENT DOCUMENTS

| | | | |
|---|---|---|---|
| CN | 103257498 | A | 8/2013 |
| CN | 106611588 | A | 5/2017 |
| CN | 109243392 | A | 1/2019 |
| CN | 109523963 | A | 3/2019 |
| CN | 111091792 | A | 5/2020 |
| JP | 5619102 | B2 | 11/2014 |
| KR | 20160081861 | A | 7/2016 |
| KR | 20160083791 | A | 7/2016 |

* cited by examiner

GATE ON ARRAY (GOA) CIRCUIT FOR DISPLAY PANEL SOLVING PROBLEM OF INCONSISTENT IMPEDANCES AND CAPACITIVE REACTANCE OF CLOCK SIGNAL CARRIERS

FIELD OF INVENTION

The present application relates to the field of display technologies, in particular to the field of progressive scan driving technologies, and more particularly, to a display panel and a display device.

BACKGROUND OF INVENTION

The gate driver on array (GOA) technology is to utilize existing manufacturing processes of liquid crystal display panels to form driving circuits of horizontal scanning lines on a substrate surrounding a display area, so as to replace external integrated circuits to accomplish horizontal scanning line driving. In the thin film transistor (TFT) substrate circuit design for the GOA circuits, by manufacturing the specific GOA circuits on the TFT substrate, the TFT substrate is provided with the row driving function.

When the GOA circuits perform progressive scanning, some clock signals are needed to control the GOA circuits to operate in order, and transmission of these clock signals requires corresponding carriers. However, the carriers affect the normal transmission of the clock signals and interfere with the orderly operation of the GOA circuits due to the inconsistency of impedance and capacitive reactance, resulting in the appearance of horizontal dark lines.

SUMMARY OF INVENTION

Technical Problems

The present application provides a display panel to solve the problem of inconsistent impedance and capacitive reactance of the carriers transmitting these clock signals.

Technical Solutions

In a first aspect, the present application provides a display panel, comprising: a GOA circuit, a plurality of clock main lines on a side of the GOA circuit, and a plurality of clock branch lines connected to each of the corresponding clock main lines, respectively, and the plurality of clock main lines and the plurality of clock branch lines are disposed on different layers; wherein each of the clock branch lines includes an input connection component, an intermediate connection component, an output connection component, a first protrusion component and a second protrusion component; wherein each of the clock main lines is connected to a first end of the input connection component, a second end of the input connection component is connected to a first end of the first protrusion component, a second end of the first protrusion component is connected to a first end of the intermediate connection component, a second end of the intermediate connection component is connected to a first end of the second protrusion component; a second end of the second protrusion component is connected to a first end of the output connection component, and a second end of the output connection component is connected to the GOA circuit; wherein at least one of the first protrusion component and the second protrusion component is provided with a bridge component, and areas of the bridge components in the plurality of clock branch lines are different.

Based on the first aspect, in a first embodiment of the first aspect, the first protrusion component includes a first straight line segment, a second straight line segment and a third straight line segment on the same side; wherein a first end of the first straight line segment is vertically connected to a second end of the input connection component, a second end of the first straight line segment is vertically connected to a first end of the second straight line segment, a second end of the second straight line segment is vertically connected to a first end of the third straight line segment, a second end of the third straight line segment is vertically connected to the first end of the intermediate connection component, and a length of the first straight line segment is less than a length of the third straight line segment.

Based on the first embodiment of the first aspect, in a second embodiment of the first aspect, the bridge component bridges the first straight line segment and the third straight line segment, and the bridge component is parallel to the second straight line segment.

Based on the first aspect, in a third embodiment of the first aspect, the first protrusion component and the second protrusion component are located on the same side.

Based on the first embodiment of the first aspect, in a fourth embodiment of the first aspect, the second protrusion component includes a fourth straight line segment, a fifth straight line segment and a sixth straight line segment on the same side; wherein the first end of the third straight line segment is vertically connected to the second end of the intermediate connection component, a second end of the fourth straight line segment is vertically connected to a first end of the fifth straight line segment, a second end of the fifth straight line segment is vertically connected to a first end of the sixth straight line segment, a second end of the sixth straight line segment is vertically connected to the first end of the output connection component, and a length of the fourth straight line segment is greater than a length of the sixth straight line segment.

Based on the fourth embodiment of the first aspect, in a fifth embodiment of the first aspect, the bridge component bridges the fourth straight line segment and the sixth straight line segment, and the bridge component is parallel to the fifth straight line segment.

Based on the first embodiment of the first aspect, in a sixth embodiment of the first aspect, the bridge component includes at least one bridge subcomponent, and all of the bridge subcomponents bridge the first straight line segment and the third straight line segment.

Based on the sixth embodiment of the first aspect, in a seventh embodiment of the first aspect, the bridge component includes a first bridge subcomponent, a second bridge subcomponent, and a third bridge subcomponent that are the same in length and parallel to each other; and all the first bridge subcomponent, the second bridge subcomponent and the third bridge subcomponent bridge the first straight line segment and the third straight line segment.

Based on the first embodiment of the first aspect, in an eighth embodiment of the first aspect, the bridge component is adjacent to the second straight line segment.

In a second aspect, the present application provides a display device, which includes the display panel in any of the above embodiments.

Beneficial Effect

In the display panel provided by the present application, by providing the different first protrusion components and second protrusion components in the corresponding clock branch lines, the equivalent impedance of these clock branch lines can be adjusted to be equal. By providing the bridge components with different areas in the corresponding clock branch lines, the equivalent capacitive reactance of these clock branch lines can be adjusted to be equal. Thus, the problem of inconsistent impedance and capacitive reactance of carriers that transmit different clock signals are solved.

DETAILED DESCRIPTION OF PREFERRED EMBODIMENTS

In order to clearly and definitely illustrate the purpose, technical solutions and effects of the present application, the present application will be described in further detail below with reference to the accompanying drawings and examples. It should be understood that the specific embodiments described herein are only used to explain the present application, and are not used to limit the present application.

Figure 1:
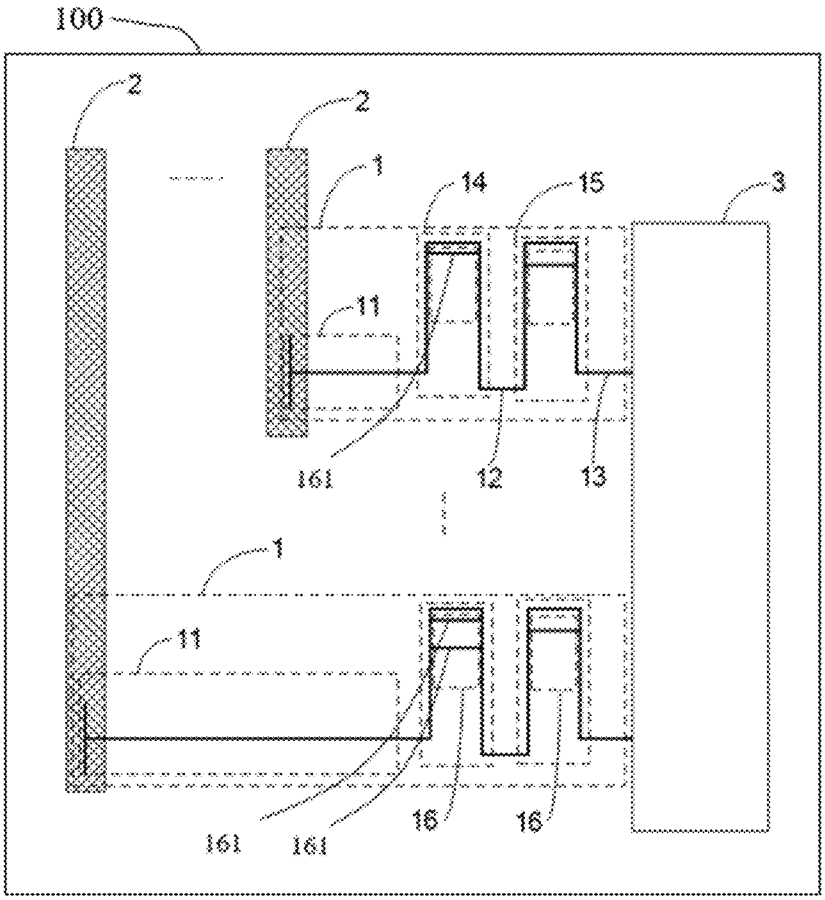
FIG. 1 is a schematic structural diagram of a display panel provided by an embodiment of the present application.

As shown in FIG. 1, the present embodiment provides a display panel 100, the purpose of which is that carriers of different circuits transmit different clock signals to the GOA circuit 3, and the carrier of each of the circuits includes a clock main line 2 and a clock branch line 1 connected to clock main line 2. The number of the clock signals corresponds to the number of carriers of the circuits for separately transmitting the corresponding clock signals. These clock main lines 2 and clock branch lines 1 are located on a side of the GOA circuit 3, and may be any of the left side, the right side, the upper side, and the lower side. It can be understood that these clock main lines 2 may be, but not limited to, located in the same film layer structure and parallel to each other, with a certain distance therebetween, and the certain distances may be the same or different. These clock branch lines 1 may be, but not limited to, in the same film structure, and in a different film layer structure from those clock main lines 2. Similarly, these clock branch lines 1 may also maintain a certain distance therebetween, and the certain distances may be the same or different. It can be understood that the clock main line 2 and the clock branch line 1 in the different film structures may be electrically connected to each other by a via. The equivalent impedance of different loop carriers may be, but not limited to, proportional to a length of the corresponding carrier of the circuit. In the present embodiment, the equivalent impedance of the corresponding carrier of the circuit is adjusted by adjusting the length of the corresponding clock branch line 1. Specifically, it can be understood that in the case that the corresponding clock main line 2 and clock branch line 1 have the same conductivity and width, the length of the clock branch line 1 can balance the equivalent impedance of different carriers of the circuits to be equal.

As mentioned above, each of the clock branch lines 1 may include, but not limited to, an input connection component 11, an intermediate connection component 12, an output connection component 13, a first protrusion component 14 and a second protrusion component 15. Each of the clock main lines 2 is connected to a first end of the input connection component 11, a second end of the input connection component 11 is connected to a first end of the first protrusion component 14, a second end of the first protrusion component 14 is connected to a first end of the intermediate connection component 12, a second end of the intermediate connection component 12 is connected to a first end of the second protrusion component 15, a second end of the second protrusion component 15 is connected to a first end of the output connection component 13, and a second end of the output connection component 13 is connected to the GOA circuit 3. At least one of the first protrusion component 14 and the second protrusion component 15 is provided with a bridge component 16, and areas of the bridge components 16 in the plurality of clock branch lines 1 are different. The input connection component 11 may be, but not limited to, T-shaped, in order to connect the clock main line 2 through a via, and the position of the via may be finely adjusted.

It should be noted that the first protrusion component 14 and the second protrusion component 15 are both the protrusion components with a protrusion height, and the protrusion height can be adjusted according to needs. The higher the protrusion is, the greater the impedance of the corresponding clock branch line 1 is. The lower the protrusion is, the less the impedance of the corresponding clock branch line 1 is. In this way, one of the objects of the invention of the present application can be well realized, i.e., adjusting the equivalent impedances of the different carriers of the circuits to be equal. The second object of the invention of the present application is to adjust the capacitance between adjacent carriers of the circuits to be equal. It can be understood that the capacitance between the carriers is proportional to the area between the carriers. In the present application, the second object of the invention of the present application is achieved by providing the bridge component 16 in the protrusion component to adjust the area between different carriers of the circuits, thereby changing the capacitance between adjacent carriers of the circuits. It can be understood that the area of the bridge component 16 is related to the number, length, and width of the bridge component 16, and the area of the bridge component 16 can be changed by adjusting at least one parameter of the number, length, and width of the bridge component 16, so as to achieve the demand for different capacitances, thereby balancing the capacitance between adjacent carriers of the circuits. It can be understood that the capacitance between different carriers affects the waveform of the falling edge of the clock signal.

It can be understood that, in the present embodiment, there can be, but not limited to, only two protrusion components. According to the needs of corresponding impedance regulation, there can be three, four or more protrusion components. Correspondingly, the intermediate connection component 12 between the two protrusion components needs to be added.

Figure 2:
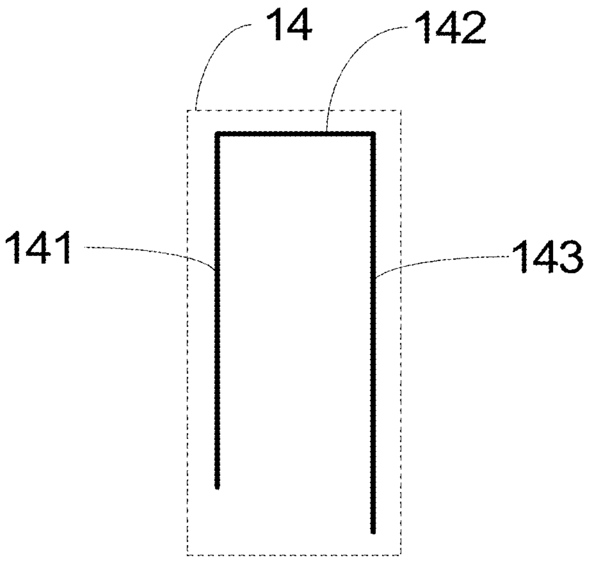
FIG. 2 is a schematic structural diagram of the first protrusion component shown in FIG. 1.

As shown in FIG. 2, in one embodiment, the first protrusion component 14 may include, but is not limited to, a first straight line segment 141, a second straight line segment 142, and a third straight line segment 143 on the same side. A first end of the first straight line segment 141 is vertically connected to a second end of the input connection component 11, a second end of the first straight line segment 141 is vertically connected to a first end of the second straight line segment 142, a second end of the second straight line segment 142 is vertically connected to a first end of the third straight line segment 143, and a second end of the third straight line segment 143 is vertically connected to the first end of the intermediate connection component 12. A length of the first straight line segment 141 is less than a length of the third straight line segment 143, so as to make good use of the space.

It should be noted that "on the same side" may refer to regarding a reference object. The first straight line segment 141, the second straight line segment 142, and the third straight line segment 143 on the same side may form a rectangular protrusion. Certainly, the protrusion can be other shapes. It can be understood that the first straight line segment 141 and the third straight line segment 143 can be used to adjust the height of the corresponding protrusion component, and the second straight line segment 142 can be used to adjust the width of the corresponding protrusion component.

In one embodiment, the bridge component 16 bridges the first straight line segment 141 and the third straight line segment 143, and the bridge component 16 is parallel to the second straight line segment 142. It should be noted that the bridge component 16 may be, but not limited to, parallel to the second straight line segment 142. Optionally, the bridge component 16 may not be parallel to the second straight line segment 142, or disposed at an angle relative to the second straight line segment 142.

In one embodiment, the first protrusion component 14 and the second protrusion component 15 are located on the same side. It can be understood that the space can be saved by placing the first protrusion component 14 and the second protrusion component 15 on the same side. When the impedance needs to be increased without an increased height of the protrusion component, the number of the protrusion component can be increased.

Figure 3:
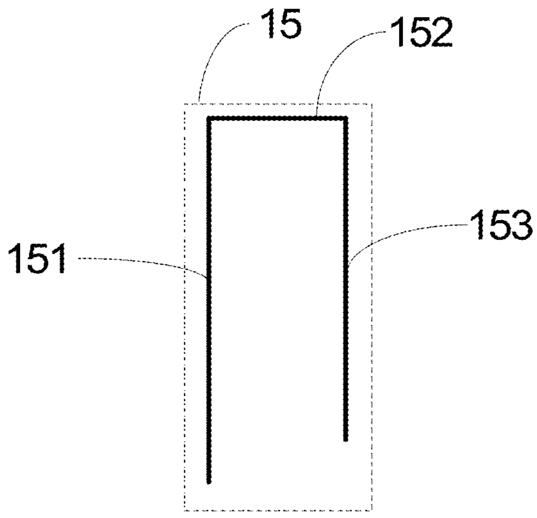
FIG. 3 is a schematic structural diagram of the second protrusion component shown in FIG. 1.

As shown in FIG. 3, in one embodiment, the second protrusion component 15 includes a fourth straight line segment 151, a fifth straight line segment 152, and a sixth straight line segment 153 on the same side. The first end of the third straight line segment 143 is vertically connected to the second end of the intermediate connection component 12, a second end of the fourth straight line segment 151 is vertically connected to a first end of the fifth straight line segment 152, a second end of the fifth straight line segment 152 is vertically connected to a first end of the sixth straight line segment 153, and a second end of the sixth straight line segment 153 is vertically connected to the first end of the output connection component 13. Moreover, a length of the fourth straight line segment 151 is greater than a length of the sixth straight line segment 153.

It should be noted that the length of the fourth straight line segment 151 may be, but not limited to, the same as the length of the third straight line segment 143. The length of the first straight line segment 141 may be, but not limited to, the same as the length of the sixth straight line segment 153.

In one embodiment, the bridge component 16 bridges between the fourth straight line segment 151 and the sixth straight line segment 153, and the bridge component 16 is parallel to the fifth straight line segment 152.

In some embodiments, the bridge component 16 includes one or more bridge subcomponents 161, and each bridge subcomponent 161 bridges the first straight line segment 141 and the third straight line segment 143. It should be noted that a number of the bridge subcomponents in the corresponding clock branch lines 1 may be one. When the number is one, the bridge subcomponent may be selected to be bridged in the first protrusion component 14 or the second protrusion component 15. In some embodiments, the bridge subcomponents 161 of the bridge component 16 include a first bridge subcomponent, a second bridge subcomponent, and a third bridge subcomponent that having a same length and are parallel to each other. Each of the first bridge subcomponent, the second bridge subcomponent, and the third bridge subcomponent bridges the first straight line 141 segment and the third straight line segment 143. It should be noted that a number of the bridge subcomponents in the present embodiment may be, but not limited to, three, two, four, or even more. In the case of the same length, the width of the corresponding bridge subcomponent can be adjusted to increase the area of the bridge component 16, so as to adjust the corresponding capacitance well.

In one embodiment, the bridge component 16 is adjacent to the second straight line segment 142. It should be noted that the closer the bridge component 16 is to the second straight line segment 142, the less the effect on the equivalent resistance of the corresponding clock branch line 1 is.

It can be understood that all the various components or straight line segments in the above embodiments are part of the clock branch lines 1, where the widths and thickness may be, but not limited to, the same, and the length and spatial distribution may be adjusted as needed to achieve the invention purpose of the present application.

Figure 4:
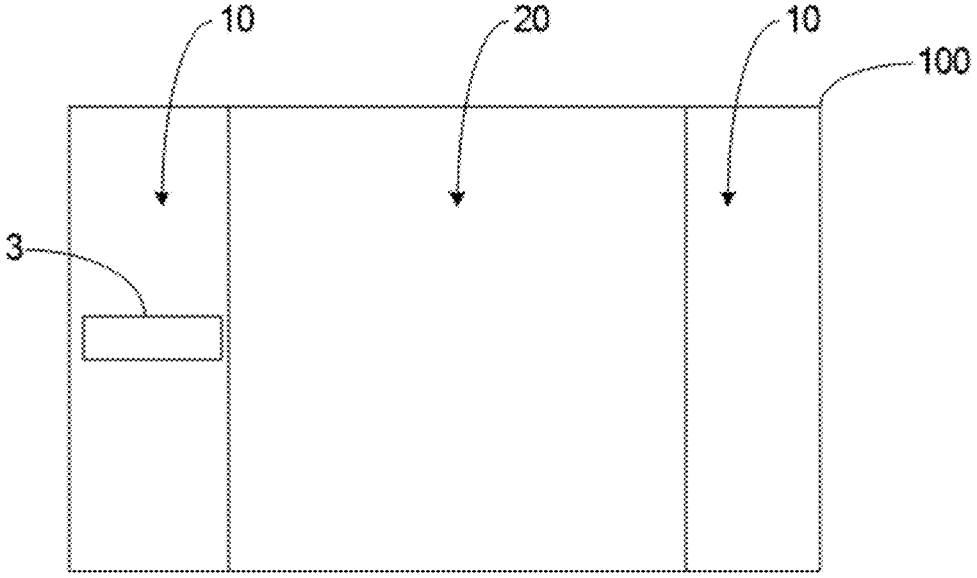
FIG. 4 is a schematic diagram of the positional relationship between a display panel and a GOA circuit provided by an embodiment of the present application.

As shown in FIG. 4, in one of the embodiments, the display panel 100 includes a display area 20 and a non-display area 10 on one side of the display area 20. The GOA circuit 3 is located in the non-display area 10 and is used to generate a scanning signal to progressively control the switch of corresponding pixels.

In one embodiment, the present application provides a display device, which includes the display panel 100 in any of the above embodiments. It can be understood that the display panel 100 provided by the present application can achieve the object of the invention of the present application. Similarly, the display device including the display panel 100 can also achieve equivalent technical effects.

It should be understood by those ordinary skilled in the art that equivalent replacements or changes can be made according to the technical solutions and inventive concepts of the present application, and all such changes or replacements should fall within the protection scope of the claims appended to the present application.

What is claimed is:

1. A display panel, comprising:

a gate driver on array (GOA) circuit;

a plurality of clock main lines, disposed on a side of the GOA circuit; and a plurality of clock branch lines, connected to the plurality of clock main lines, respectively, wherein each of the plurality of clock branch lines comprises an input connection component, an intermediate connection component, an output connection component, a first protrusion component, and a second protrusion component;

wherein the first protrusion component comprises a first straight line segment, a second straight line segment, and a third straight line segment on a same side, and the second protrusion component comprises a fourth straight line segment, a fifth straight line segment, and a sixth straight line segment on the same side;

wherein each of the plurality of clock main lines is correspondingly connected to a first end of the input connection component, a second end of the input connection component is vertically connected to a first end of the first straight line segment, a second end of the first straight line segment is vertically connected to a first end of the second straight line segment, a second end of the second straight line segment is vertically connected to a first end of the third straight line segment, a second end of the third straight line segment is vertically connected to a first end of the intermediate connection component, a second end of the intermediate connection component is vertically connected to a first end of the fourth straight line segment, a second end of the fourth straight line segment is vertically connected to a first end of the fifth straight line segment, a second end of the fifth straight line segment is vertically connected to a first end of the sixth straight line segment, a second end of the sixth straight line segment is vertically connected to a first end of the output connection component, and a second end of the output connection component is connected to the GOA circuit; and wherein the first protrusion component of each of the plurality of clock branch lines is provide with a first bridge component and the second protrusion component of each of the plurality of clock branch lines is provide with a second bridge component, the first bridge component is a structural part of the first protrusion component independent of the second straight line segment and bridges the first straight line segment to the third straight line segment, the second bridge component is a structural part of the second protrusion component independent of the fifth straight line segment and bridges the fourth straight line segment to the sixth straight line segment, and a total area of the first bridge component and the second bridge component is different in different ones of the plurality of clock branch lines.

2. The display panel of claim 1, wherein the input connection component and the output connection component are located on a same straight line, which is different from, but parallel to, another straight line where the intermediate connection component is located; the first end of the first straight line segment, the second end of the first straight line segment, and the first end of the third straight line segment are located on a same side of the input connection component, and the first end of the third straight line segment and the second end of the third straight line segment respectively extend beyond two opposite sides of the input connection component, and a length of the first straight line segment is less than a length of the third straight line segment.

3. The display panel of claim 2, wherein the first bridge component is parallel to the second straight line segment.

4. The display panel of claim 2, wherein the first end of the fourth straight line segment and the second end of the fourth straight line segment respectively extend beyond two opposite sides of the output connection component, the second end of the fourth straight line segment, the first end of the sixth straight line segment, and the second end of the sixth straight line segment are located on a same side of the output connection component, and a length of the fourth straight line segment is greater than a length of the sixth straight line segment.

5. The display panel of claim 4, wherein the second bridge component is parallel to the fifth straight line segment.

6. The display panel of claim 1, wherein the first bridge component comprises one or more bridge subcomponents, and each of the one or more bridge subcomponents bridges between the first straight line segment and the third straight line segment.

7. The display panel of claim 6, wherein the one or more bridge subcomponents comprise a first bridge subcomponent, a second bridge subcomponent, and a third bridge subcomponent that have a same length and are parallel to each other.

8. The display panel of claim 1, wherein a direct connection point between the first straight line segment and the first bridge component is located at a non-end position on the first straight line segment, a direct connection point between the third straight line segment and the first bridge component is located at a non-end position on the third straight line segment, and the first bridge component is arranged adjacent to the second straight line segment.

9. The display panel of claim 1, wherein a direct connection point between the fourth straight line segment and the second bridge component is located at a non-end position on the fourth straight line segment, a direct connection point between the sixth straight line segment and the second bridge component is located at a non-end position on the sixth straight line segment, and the second bridge component is arranged adjacent to the fifth straight line segment.

10. A display device, comprising a display panel, wherein the display panel comprises:

a gate driver on array (GOA) circuit;

a plurality of clock main lines, disposed on a side of the GOA circuit; and a plurality of clock branch lines, connected to the plurality of clock main lines, respectively, wherein each of the plurality of clock branch lines comprises an input connection component, an intermediate connection component, an output connection component, a first protrusion component, and a second protrusion component;

wherein each of the plurality of clock main lines is correspondingly connected to a first end of the input connection component, a second end of the input connection component is vertically connected to a first end of the first straight line segment, a second end of the first straight line segment is vertically connected to a first end of the second straight line segment, a second end of the second straight line segment is vertically connected to a first end of the third straight line segment, a second end of the third straight line segment is vertically connected to a first end of the intermediate connection component, a second end of the intermediate connection component is vertically connected to a first end of the fourth straight line segment, a second end of the fourth straight line segment is vertically connected to a first end of the fifth straight line segment, a second end of the fifth straight line segment is vertically connected to a first end of the sixth straight line segment, a second end of the sixth straight line segment is vertically connected to a first end of the output connection component, and a second end of the output connection component is connected to the GOA circuit; and wherein the first protrusion component of each of the plurality of clock branch lines is provide with a first bridge component and the second protrusion component of each of the plurality of clock branch lines is provide with a second bridge component, the first bridge component is a structural part of the first protrusion component independent of the second straight line segment and bridges the first straight line segment to the third straight line segment, the second bridge component is a structural part of the second protrusion component independent of the fifth straight line segment and bridges the fourth straight line segment to the sixth straight line segment, and a total area of the first bridge component and the second bridge component is different in different ones of the plurality of clock branch lines.

11. The display device of claim 10, wherein the input connection component and the output connection component are located on a same straight line, which is different from, but parallel to, another straight line where the intermediate connection component is located; the first end of the first straight line segment, the second end of the first straight line segment, and the first end of the third straight line segment are located on a same side of the input connection component, and the first end of the third straight line segment and the second end of the third straight line segment respectively extend beyond two opposite sides of the input connection component, and a length of the first straight line segment is less than a length of the third straight line segment.

12. The display device of claim 11, wherein the first bridge component is parallel to the second straight line segment.

13. The display device of claim 11, wherein the first end of the fourth straight line segment and the second end of the fourth straight line segment respectively extend beyond two opposite sides of the output connection component, the second end of the fourth straight line segment, the first end of the sixth straight line segment, and the second end of the sixth straight line segment are located on a same side of the output connection component, and a length of the fourth straight line segment is greater than a length of the sixth straight line segment.

14. The display device of claim 13, wherein the second bridge component is parallel to the fifth straight line segment.

15. The display device of claim 10, wherein the first bridge component comprises one or more bridge subcomponents, and each of the one or more bridge subcomponents bridges between the first straight line segment and the third straight line segment.

16. The display device of claim 15, wherein the one or more bridge subcomponents comprise a first bridge subcomponent, a second bridge subcomponent, and a third bridge subcomponent that have a same length and are parallel to each other.

17. The display device of claim 10, wherein a direct connection point between the first straight line segment and the first bridge component is located at a non-end position on the first straight line segment, a direct connection point between the third straight line segment and the first bridge component is located at a non-end position on the third straight line segment, and the first bridge component is arranged adjacent to the second straight line segment.

18. The display device of claim 10, wherein a direct connection point between the fourth straight line segment and the second bridge component is located at a non-end position on the fourth straight line segment, a direct connection point between the sixth straight line segment and the second bridge component is located at a non-end position on the sixth straight line segment, and the second bridge component is arranged adjacent to the fifth straight line segment.

* * * * *